United States Patent
Sberveglieri

[11] Patent Number: 5,943,932
[45] Date of Patent: *Aug. 31, 1999

[54] BEVEL TABLE SAW ADJUSTMENT

[75] Inventor: Umberto Sberveglieri, Novellara, Italy

[73] Assignee: Black & Decker, Inc., Newark, Del.

[ * ] Notice: This patent is subject to a terminal disclaimer.

[21] Appl. No.: 08/932,437

[22] Filed: Sep. 17, 1997

Related U.S. Application Data

[63] Continuation of application No. 08/570,956, Dec. 12, 1995, Pat. No. 5,720,213.

[30] Foreign Application Priority Data

Dec. 12, 1994 [GB] United Kingdom ............... 9425391

[51] Int. Cl.⁶ ..................... B23D 45/06; B27B 5/20
[52] U.S. Cl. .............. 83/471.3; 83/473; 83/477.1; 83/477.2; 83/486.1; 83/581; 83/582
[58] Field of Search ................... 83/471.3, 473, 83/477.1, 477.2, 486.1, 581, 582

[56] References Cited

U.S. PATENT DOCUMENTS

| | | | |
|---|---|---|---|
| 1,821,113 | 9/1931 | Neighbour | 83/473 |
| 2,260,421 | 10/1941 | Tracy | 83/486.1 |
| 2,704,560 | 3/1955 | Woessner | 83/477.2 X |
| 2,850,054 | 9/1958 | Eschenburg | 83/473 |
| 2,852,047 | 9/1958 | Odlum et al. | 83/473 |
| 3,013,592 | 12/1961 | Ambrosio et al. | 83/473 |
| 3,124,178 | 3/1964 | Packard | 83/473 |
| 3,315,554 | 4/1967 | Jaegers | 83/582 X |
| 3,344,819 | 10/1967 | Mitchell | 83/486.1 X |
| 3,670,788 | 6/1972 | Pollak et al. | 83/471.3 X |
| 4,516,612 | 5/1985 | Wiley | 83/477.2 X |
| 5,040,444 | 8/1991 | Shiotani et al. | 83/473 |

FOREIGN PATENT DOCUMENTS

| | | |
|---|---|---|
| 570904 | 11/1993 | European Pat. Off. |
| N15177 | of 1914 | United Kingdom . |
| 845134 | 8/1960 | United Kingdom . |

*Primary Examiner*—Eugenia A. Jones
*Attorney, Agent, or Firm*—Adan Ayala

[57] ABSTRACT

A bevel table saw 10 comprising a table 14 supported by a frame 12, the table 14 defining a slot 16 for a saw blade 44, and a blade assembly 30 mounted to the frame 12 below the table 14 such that, in use, a saw blade 44 of the blade assembly 30 protrudes through the slot 16 to cut workpieces on the table 14, wherein the depth of cut of the saw blade 44 is adjusted automatically when bevel cuts are made in a workpiece. As a result, clashing of the blade assembly 30 with the underside of the table 14 or he frame 12 is automatically avoided, thereby simplifying se of the table saw 10 during the making of bevel cuts.

19 Claims, 5 Drawing Sheets

BEVEL TABLE SAW ADJUSTMENT

This application is a continuation of application Ser. No. 08/570,956, filed Dec. 12, 1995 now U.S. Pat. No. 5,720, 213.

This invention relates to table saws, and in particular to a table saw wherein the saw blade can be angled to make bevel cuts in a workpiece mounted on the table.

Table saws incorporate a table having a through-slot for accommodating a saw blade. A drive for the saw blade is accommodated below the table surface so that only a portion of the saw blade is exposed above the table surface. As a result, to cut a workpiece, a workpiece can be either moved past the rotating saw blade or held firmly overlying the slot in the table while the saw blade is drawn along the slot (which in this event is long) and through the workpiece. Such table saws are well known.

Bevel table saws, essentially the same as the table saws described above, are also known wherein the angle of the saw blade can be adjusted to allow angled or bevel cuts to be made in a workpiece positioned on the table.

Problems arise with many of the prior art bevel table saws by virtue of the fact that the assembly which carries the saw blade and incorporates a motor which drives the saw blade is, of necessity, relatively large and can clash with either the underside of the table or other support structure below the table surface when the orientation of the saw blade is being changed. Moreover, the nearer the saw blade axle gets to the under surface of the table, (which it does when the depth of cut of the saw blade is required to be a maximum) then the more likely there is to be a contact with the table during bevelling. While the blade is vertical, the depth of cut can be large without any component (e.g. the blade axle) contacting the under surface of the table; but as soon as the blade is bevelled, the blade axle (or its mounting) which must extend sideways from the blade at least on one side of the blade, is likely to contact the underside simply because it is so close under the table.

While this problem can be ignored when bevelling only in one direction, by mounting the blade at one end of the blade axle and having very little lateral extension of the blade axle on the side of the blade facing the direction of bevel, this does not solve the problem when double bevelling is employed, and in fact would exacerbate the problem on the other side of the blade.

Thus it is evident that sideways extension out of the plane of the blade should firstly be minimised, as far as possible, and secondly be balanced. Even so, it is apparent that even with minimised and well balanced sideways extension, when the depth of cut of the blade is at its maximum in the non-bevelled position, the depth of cut must be reduced to permit bevelling without contact with the under surface of the table. In the light of this, the present invention aims to improve upon the known prior art bevel table saws by providing an arrangement which allows the saw blade to be angled relative to the vertical in both directions to produce bevel cuts.

According to the present invention, there is provided a bevel table saw comprising a table supported by a frame, and a blade assembly mounted below the table and adapted to carry a saw blade which protrudes through a slot in the table to cut workpieces on the table, the blade assembly being pivotable between two limits about an axis parallel the slot to permit bevel cuts in the workpiece, wherein, as the blade is bevelled in at least one direction, the depth of cut of the saw blade is adjusted automatically so that any contact of the blade assembly with the underside of the table does not prevent further bevelling within said limits.

By providing an arrangement wherein the depth of cut of the saw blade (i.e. the degree to which the saw blade protrudes through the slot in the table) is adjusted automatically when the saw blade is bevelled it is possible for the blade assembly to take up the required position below the table surface. With this in mind, in the prior art, it has either not been possible to swing the blade assembly to both sides of the vertical to effect bevel cuts or been necessary to adjust manually the depth of cut of the saw blade before a bevel cut can be made. Hence, the present invention provides a distinct improvement over the known bevel table saws.

Preferably biasing means are provided for continuously urging the saw blade towards a maximum depth of cut position, the blade being free to deflect away from said position against said bias. Further, the strength of the biasing means should be sufficient to hold the saw blade in position during cutting of a workpiece on the table (i.e. there should be little or no deflection of the saw blade during cutting of a workpiece).

Preferably the blade assembly bears against the underside of the table or the frame to effect said automatic adjustment of the depth of cut of the saw blade.

The blade assembly may include a roller which bears against the underside of the table or the frame during automatic adjustment of the depth of cut of the blade. Further, the roller is preferably positioned to roll in a direction parallel to the slot in the table. As a result, if the saw blade is drawn through a workpiece, the roller can simply roll along the underside of the table or the frame.

A ramp may be provided on the underside of the table against which the roller can bear as the saw blade is bevelled. The size and shape of the ramp will, of course, be designed to ensure that the saw blade is withdrawn sufficiently to prevent the blade assembly clashing with the underside of the table and preventing further bevelling.

Preferably the blade assembly is mounted on a carriage mounted on a pair of parallel bars such that the carriage and the blade assembly can be moved along the bars to draw the saw blade along the slot. Further, the carriage and the blade assembly are preferably drawn along the bars by means of a slide rod attached to the carriage which is accessible from outside the frame.

Preferably, of course, the depth of cut of the saw blade is also be adjusted manually. Further, the manual adjustment of the depth of cut of the saw blade is preferably effected by rotating the slide rod attached to the carriage.

Manual adjustment of the depth of cut of the saw blade may be achieved via a rack and pinion arrangement or a screw threaded worm drive arrangement, for example. Any other appropriate means for raising and lowering the saw blade and/or blade assembly could, of course, alternatively be used.

In one embodiment of the invention, the rack and pinion is mounted on the carriage for raising and lowering the blade assembly relative to the carriage.

The bars may be attached to supports which are slidably carried by the frame such that the bars, supports, carriage and blade assembly can swing about an angle of 90° to effect bevel cuts in both directions in a workpiece. In such an arrangement, screw threaded worm drives may interact with the supports to adjust the position of the supports, and hence bars, relative to the frame, thereby raising and lowering the height of the saw blade.

Specific embodiments of the present invention are now described, by way of example only, with reference to the accompanying drawings, in which.

Figure 1:
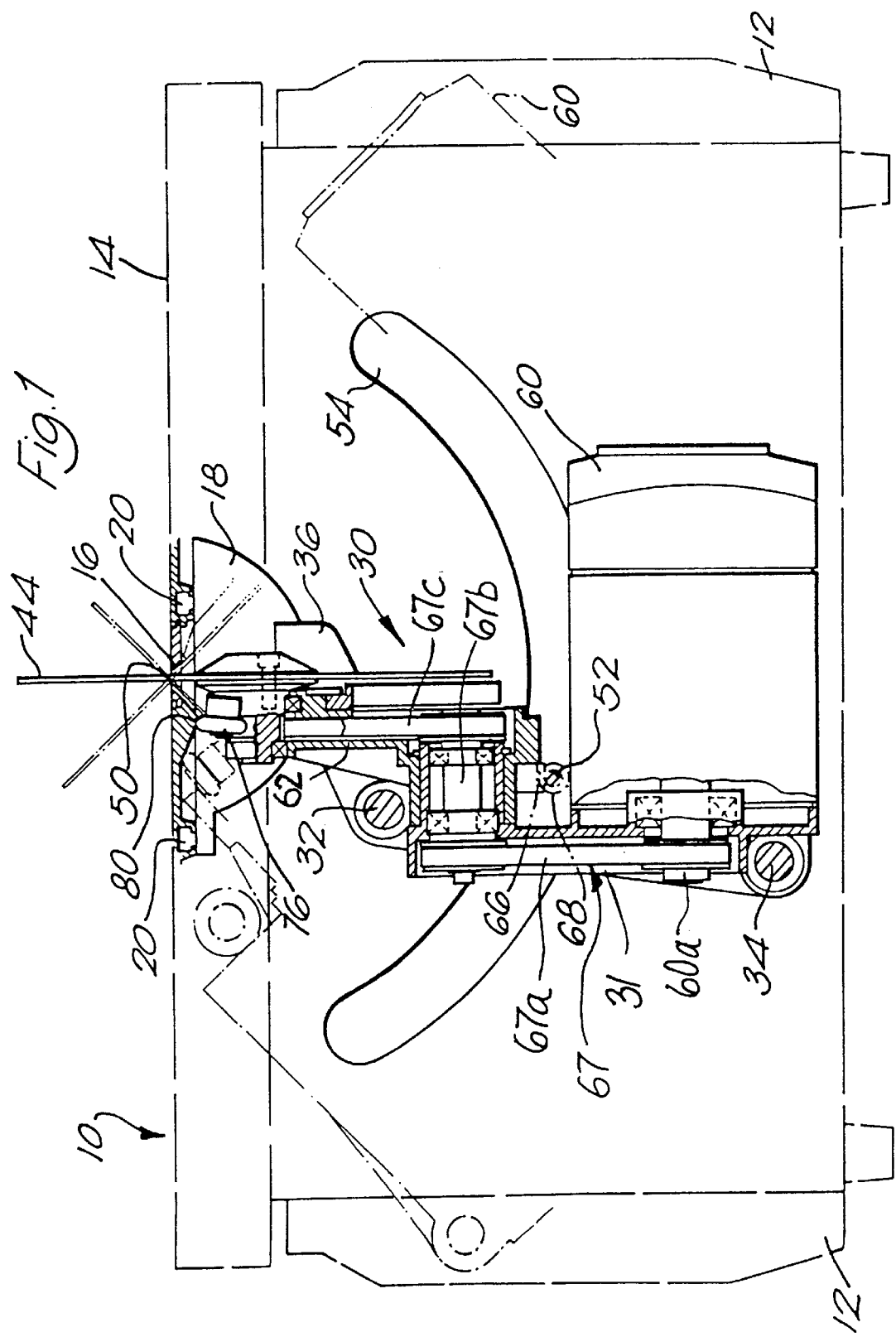
FIG. 1 is a front view with parts cut away of a double bevel table saw according to the present invention.

With reference to the drawings in which common components have been numbered the same, a double bevel table saw 10 according to the present invention comprises a frame 12 having a table 14 in which is formed a long through-slot 16.

At each end of the table 14, at the ends of the slot 16, a half-round bracket 18 is fixed in channels 20 formed in the underside of the table 14 on either side of the slot 16. The bracket 18 has a half-round track 22 whose centre 50 coincides with the top surface of the table 14 and the line of the slot 16.

Engaged with the tracks 22 for sliding, arcuate movement thereon is a saw assembly 30. The saw assembly 30 is mounted on a carriage 31 which in turn is slidably mounted on two parallel bars 32,34 secured between end frames 36,38. The end frames 36,38 each have a short, arcuate channel section 40 for engagement with the track 22. Means (not shown) are provided to ensure that the channel sections 40 slide along the tracks 22 so that the pivot axis remains at the centre 50.

The carriage 31 can slide along the bars 32,34 such that a saw blade 44 of the saw assembly 30 can be drawn along the slot 16. Further, by virtue of the end frame 36,38, and hence the parallel bars 32,34, carriage 31 and saw assembly 30, being able to swing about centre 50 on the tracks 22, the saw blade 44 can be angled relative to the vertical to make bevel cuts in a workpiece mounted on the table 14.

Figure 2:
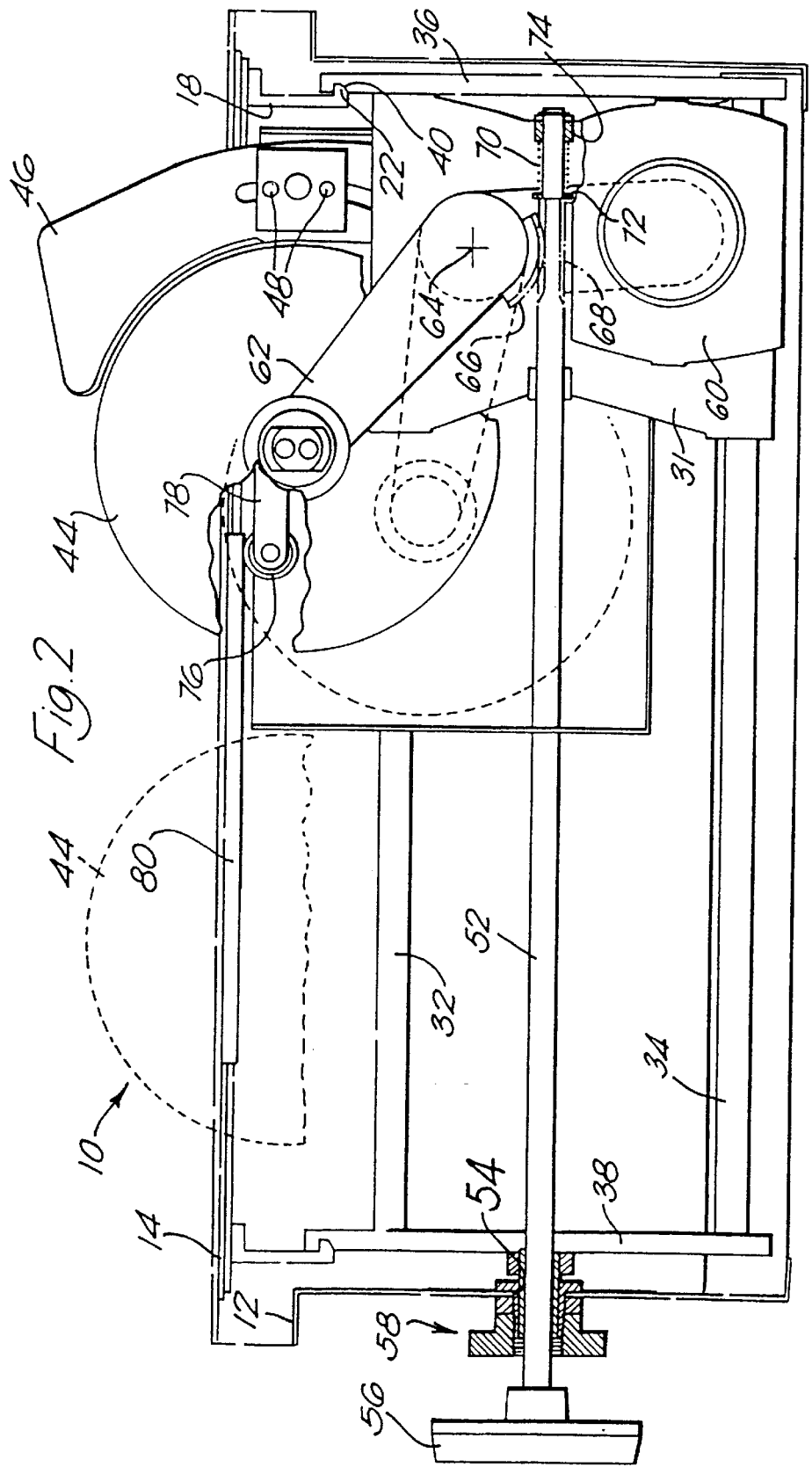
FIG. 2 is a side view of the saw of FIG. 1.
Figure 3:
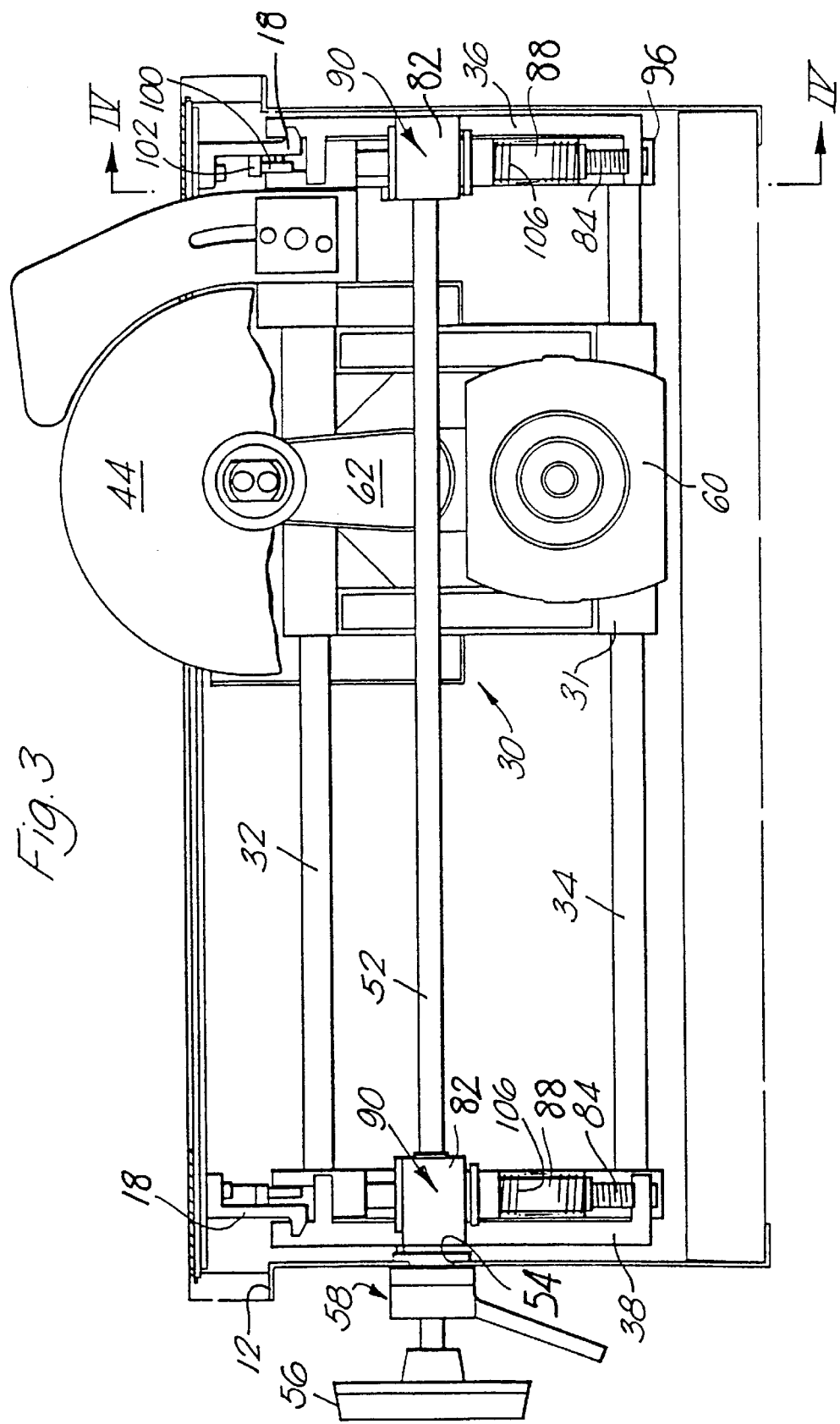
FIG. 3 is a side view of a second embodiment of bevel table saw according to the present invention.

A riving knife 46 is positioned to follow the saw blade 44, as shown in FIGS. 2 and 3 of the accompanying drawings. Although the riving knives 46 shown in the drawings are shown fixed in position by bolts 48, they could be supported in any appropriate fashion, such as by a parallelogram linkage which is used to ensure that the riving knife remains at the same orientation relative to the saw blade during rising and lowering of the saw blade.

Turning now specifically to the first embodiment shown in FIGS. 1 and 2 of the accompanying drawings, the carriage 31 is attached to a rod 52 which extends through an arcuate slot 54 in the front of the frame 12 of the table saw 10. A knob 56 at the end of the rod 52 can be used to swing the end frames 36,38 about the centre 50 and also to draw the carriage 31 along the bars 32,34. When the angle of the saw blade 44 has been adjusted using the knob 56, a clamp 58 the front wall of the frame 12 can be tightened to hold the rod 52, and hence the saw blade 44, in position.

The saw assembly 30 comprises a motor 60, a support arm 62 carrying the saw blade 44 and drive means 67 for transferring drive from the motor 60 to the saw blade 44. Drive means 67 comprises a belt 67a, driven by motor drive shaft 60a, which drives layshaft 67b. A further belt 67c mounted on the lay shaft drives the blade 44.

The height of the saw blade 44 is determined by the orientation of the support arm 62, which can pivot about axis 64. The orientation of the support arm 62 is dictated by a manual adjusting mechanism, which includes a rack 66 and pinion 68 as shown in FIG. 2. As the rod 52 is rotated using the knob 56, the rack and pinion engage to adjust the orientation of the support arm 62, thereby raising or lowering the saw blade 44. A biasing mechanism such as spring 70 mounted on the rod 52 between end stop 72,74 urges the pinion 68 away from the end frame 36, thereby forcing the support arm 62 to raise the saw blade 44. Hence, the saw blade 44 is always biased towards an exposed position.

With reference to FIG. 1 of the drawings, when the saw assembly is swung 45° to the right, there is sufficient space below the table 14 within the frame 12 for the motor 60 and other parts of the apparatus to be accommodated without clashing. Hence, the saw blade 44 can remain fully exposed. However, if the saw blade 44 is at its maximum depth of cut (i.e. fully exposed) and the saw assembly 30 is swung 45° to the left (as viewed in FIG. 1), portions of the saw assembly 30 clash with the underside of the table 14 unless the saw blade 44 is withdrawn. Hence, the present invention provides an apparatus whereby automatic withdrawal of the saw blade 44 is effected.

This apparatus is the depth adjusting mechanism, which comprises an extension arm 78 attached to the support arm 62 and a roller 76 mounted on the extension arm 78, as shown in FIGS. 1 and 2. The roller 76 is arranged to rotate in a direction substantially parallel to the slot 16 in the table 14, so that the roller can rotate when the blade 44 is drawn along the slot 16. When the saw blade 44 is vertical, as shown in FIG. 1, the roller 76 abuts a region towards the top of a ramp 80 which is formed on the underside of the table 14. As the saw assembly 30 is swung about the centre 50 to an angle of approximately 45° to effect bevel cuts, the roller 76 slides down the ramp 80 to the position shown in phantom lines in FIG. 1. As this occurs, the saw assembly 30 is urged away from the underside of the table 14 against the biasing effect of spring 70 to withdraw partially the saw blade 44. As a result, the depth of cut of the saw blade 44 is reduced and clashing between the saw assembly 30 and the underside of the table 14 is avoided.

As will be appreciated, by virtue of the spring 70 and roller 76/ramp 80 contact, automatic repositioning of the saw assembly 30 is achieved without the user having to take any additional action. Hence, bevel cuts can be made in a workpiece far more easily than is the case of the known prior art.

When the saw assembly 30 is once again returned to its normal position with the saw blade 44 vertical, the saw blade 44 is returned to its maximum depth of cut position by virtue of the spring 70 urging the support arm 62 into its maximum raised position.

Of course, it should be appreciated that, if the saw blade is not in its maximum depth of cut position, it may be possible to make bevel cuts in both directions without the saw blade needing to be withdrawn. This is because clashing between the saw assembly 30 and the underside of the table 14 may not occur.

Figure 4:
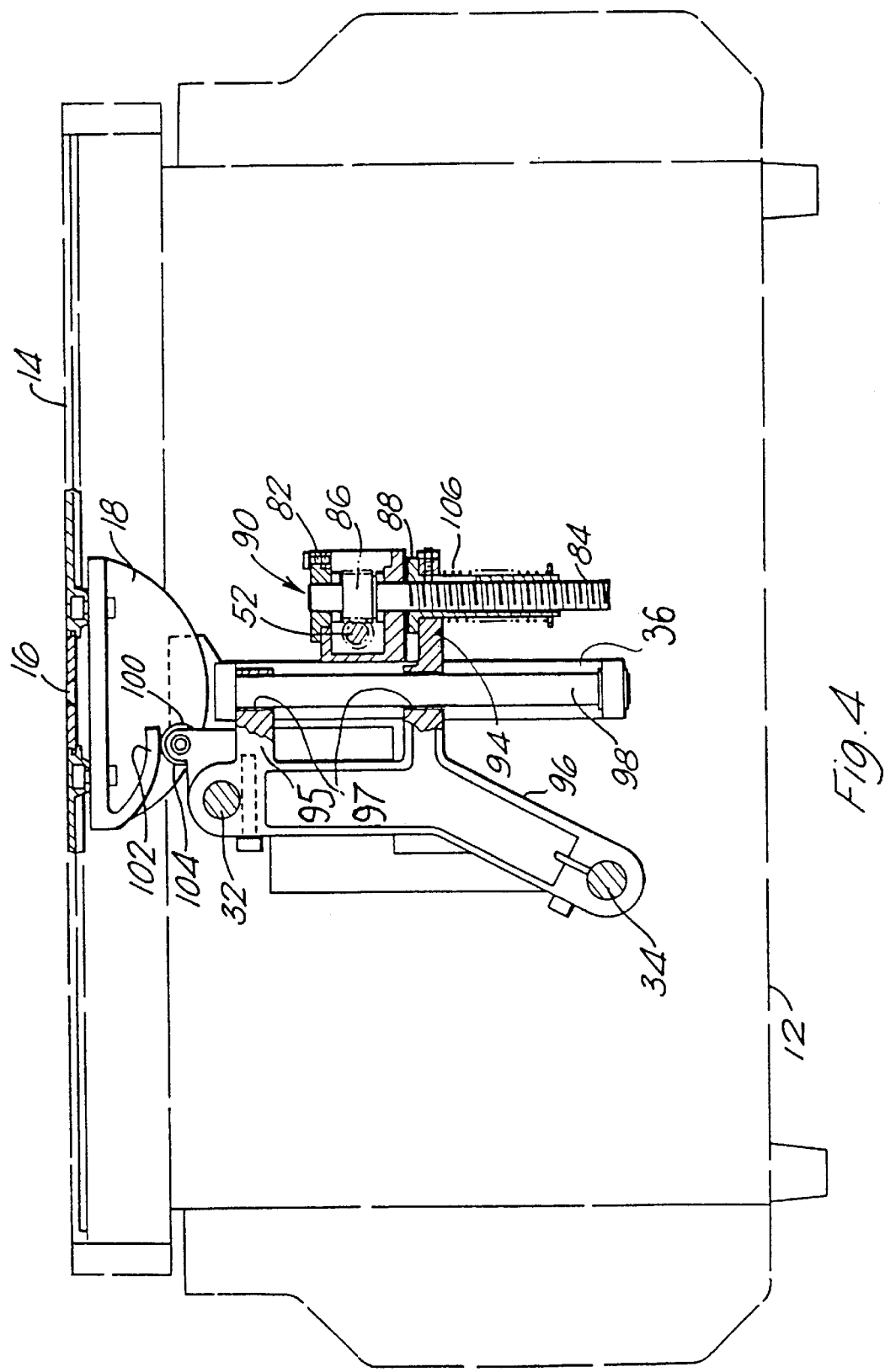
FIG. 4 is a view in the direction IV—IV shown in FIG. 3.
Figure 5:
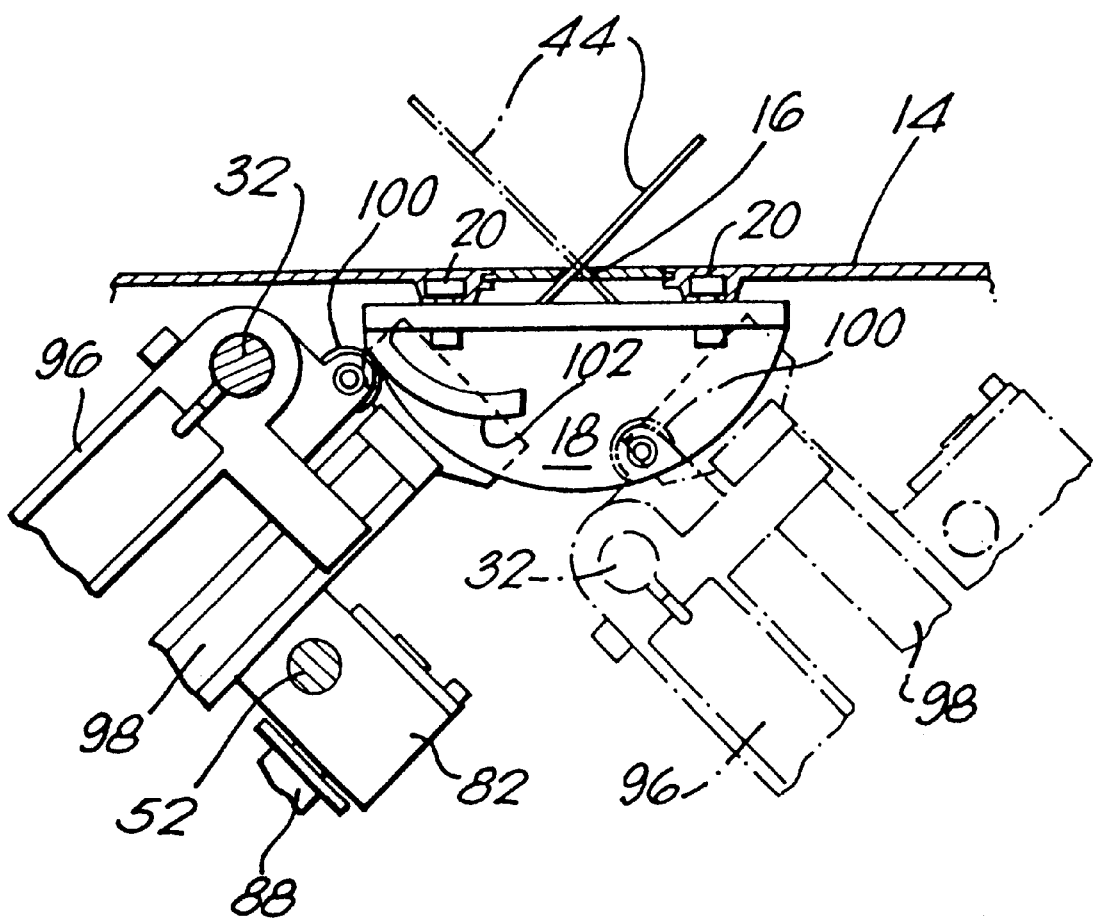
FIG. 5 is an enlarged view of a portion of FIG. 4 showing the positions of the saw blade and blade assembly when bevel cuts are being made.

Turning now to the second embodiment of double bevel table saw according to the present invention as shown in FIGS. 3–5 of the accompanying drawings, the saw assembly 30 is once again mounted on a carriage 31, but this time the support arm 62 is essentially fixed and the height of the saw blade 44 is determined by means of screw threaded worm drives 90 which drive the parallel bars 32,34 and hence the carriage 31 and saw assembly 30, upwards and downwards as one unit. More particularly, each end frame 36,38 carries a box member 82 receiving a substantially vertical threaded rod 84. A manual adjusting mechanism is provided and includes a pinion 86 fixed to each threaded rod 84. The pinion 86 and engages respective worm drive portions of the substantially horizontal rod 52. As a result of turning the rod 52 using knob 56, the vertical threaded rod 84 is rotated and results in a threaded spring holder 88 screwed on the vertical rod 84 being moved down the rod 84. This occurs because the spring holder 88 is prevented from rotating with the vertical rod 84 by virtue of an arm 94 of a bar support 96, one of which is positioned at either end of the bars 32,34. Both the arm 94 and a second arm 95 have bearing bushes 97 which slide on guide rails 98 provided by the end frames 36,38. It should of course be made clear that, in this embodiment, there is another rod (not shown) by means of which carriage 31 is drawn along the bars 32,34. Such rod may pass through the same arcuate slot 54 as the rod 52, displaced sideways, or through a separate concentric slot.

The bar supports 96 also carry rollers 100 which abut ramps 102 formed on the brackets 18 when the saw blade 44 is in its maximum depth of cut position. The rollers 100 are an alternative embodiment of the depth adjusting mechanism. Hence, as the saw assembly 30, carriage 31, and bar supports 96 are swung to the left (as shown in FIGS. 4 and 5 and after release of clamp 58 and user operation of the knob 56) through an angle of as much as 45° to position the saw blade 44 for a bevel cut, the rollers 100 roll down the ramps 102 forcing the arms 94,95 to slide down the rails 98 compressing spring 106 and moving bar supports 96 away from the table 14. This results in the bars 32,34, carriage 31 and saw assembly 30 also being moved, thus reducing the depth of cut of the saw blade 44. Once again, however, by virtue of this movement, clashing of the apparatus with the underside of the table 14 is avoided.

As in the previous embodiment, a biasing mechanism such as spring 106 is provided, this time on the spring holder 88, to urge the bar support 96, and hence the saw blade 44, towards a maximum depth of cut position. Thus, when the saw blade 44 is once again positioned vertically, it will be in its maximum depth of cut position (unless, of course, the user manually reduces the depth of cut by rotating knob 56 which screws spring holder 88 down rod 84 and slides arms 94,95 and bar holders 96 down the rails 88 on the end frames 36,38).

The difference between the depth of cut of the saw blade 44 in the two 45° bevel positions can be seen clearly in FIG. 5 of the drawings. As further seen in FIG. 5, only one ramp 102 is provided on each bracket 18, since the problem of clashing only occurs in one bevel cut direction.

Although two embodiments of the present invention have been described with reference to the drawings, it should be appreciated that other arrangements may be used. For example, rather than having a spring biased rack and pinion arrangement for raising the saw blade 44 (as shown in the first embodiment), the saw assembly 30 could simply be raised and lowered relative to the carriage 31 using any appropriate means, such as a spring biased worm drive, for example. Those skilled in the art will undoubtedly be able to devise other means for achieving the same function, wherein the saw blade 44 is continuously biased into its maximum depth of cut position and yet is withdrawn automatically when a bevel cut is to be made to one side of the vertical, thereby avoiding clashing of the saw assembly 30 with the underside of the table 14 or other support structure of the frame 12.

It will of course be understood that the present invention has been described above purely by way of example, and that modifications of detail can be made within the scope of the invention.

I claim:

1. A bevel table saw comprising:
   a table having a saw blade slot and an underside;
   a frame supporting the table;
   a saw assembly mounted below the table, the saw assembly being pivotable about an axis substantially parallel to the slot; and
   a depth adjusting mechanism connected to the saw assembly for automatically adjusting saw blade cut depth as the saw assembly is pivoted, the depth adjusting mechanism comprising a roller connected to the saw assembly bearing against the underside of the table.

2. A saw as claimed in claim 1, wherein the saw assembly is pivotable in two directions from a position substantially perpendicular to the table.

3. A saw as claimed in claim 1, wherein the underside of said table comprises a ramp against which the roller bears.

4. A saw as claimed in claim 1, further comprising a biasing mechanism connected to the saw assembly for urging the saw assembly towards a maximum cut depth position.

5. A saw as claimed in claim 4, wherein the biasing mechanism comprises a spring.

6. A saw as claimed in claim 1, wherein the saw assembly is slidably mounted below the table.

7. A saw as claimed in claim 1, wherein the saw assembly is pivotable at least 45°.

8. A saw as claimed in claim 1, further comprising a manual adjusting mechanism connected to the saw assembly for manually adjusting saw blade cut depth.

9. A saw as claimed in claim 1, further comprising a bar supporting the saw assembly, wherein the saw assembly is slidably mounted on the bar.

10. A saw as claimed in claim 9, further comprising:
    an arcuate track mounted under the table, the track being centered on the axis; and
    an end support slidably carried by the track, the end support supporting the bar.

11. A saw as claimed in claim 9, further comprising a slide rod attached to the saw assembly for drawing the saw assembly along the bar.

12. A saw as claimed in claim 11, wherein the saw assembly further comprises a manual adjusting mechanism for manually adjusting saw blade cut depth, the manual adjusting mechanism being connected to the slide rod and to the saw assembly.

13. A saw as claimed in claim 12, wherein the saw blade cut depth is manually adjusted by rotating the slide rod.

14. A saw as claimed in claim 12, wherein the manual adjusting mechanism comprises a rack; and
    the slide rod comprises a pinion, the pinion engaging the rack.

15. A saw as claimed in claim 1, further comprising a plurality of bars supporting the saw assembly, wherein the saw assembly is slidably mounted on the bars.

16. A saw as claimed in claim 15, further comprising:
    a plurality of arcuate tracks mounted under the table, the tracks being centered on the axis; and
    a plurality of end supports slidably carried by the tracks, each end support being slidably carried by a corresponding track, the end supports supporting the bars.

17. A saw as claimed in claim 15, further comprising a slide rod attached to the saw assembly for drawing the saw assembly along the bars.

18. A saw as claimed in claim 17, wherein the saw assembly further comprises a manual adjusting mechanism for manually adjusting saw blade cut depth, the manual adjusting mechanism being connected to the slide rod and to the saw assembly.

19. A saw as claimed in claim 18, wherein the saw blade cut depth is manually adjusted by rotating the slide rod.

* * * * *